United States Patent
Zhao et al.

(10) Patent No.: US 9,659,220 B2
(45) Date of Patent: May 23, 2017

(54) METHOD AND APPARATUS FOR UPDATING SCENE MODEL AND VIDEO SURVEILLANCE

(71) Applicant: CANON KABUSHIKI KAISHA, Tokyo (JP)

(72) Inventors: Xuyu Zhao, Beijing (CN); Long Jiang, Beijing (CN); Yong Jiang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/626,182

(22) Filed: Mar. 16, 2015

(65) Prior Publication Data

US 2015/0363649 A1    Dec. 17, 2015

(30) Foreign Application Priority Data

Jun. 17, 2014    (CN) .......................... 2014 1 0268132

(51) Int. Cl.
*G06K 9/00* (2006.01)
*G06K 9/38* (2006.01)

(52) U.S. Cl.
CPC ........... *G06K 9/00771* (2013.01); *G06K 9/38* (2013.01)

(58) Field of Classification Search
CPC ........... G06K 9/00711; G06K 9/00771; G06K 9/6267
See application file for complete search history.

(56) References Cited

U.S. PATENT DOCUMENTS

| 2004/0120581 A1* | 6/2004 | Ozer | G06K 9/00335 382/224 |
| 2008/0118161 A1* | 5/2008 | Liu | G06K 9/6269 382/228 |
| 2011/0142301 A1* | 6/2011 | Boroczky | G06T 7/0012 382/128 |
| 2012/0163658 A1* | 6/2012 | Pakulski | G06T 7/2053 382/103 |
| 2012/0257053 A1* | 10/2012 | Gupta | H04N 7/181 348/143 |

* cited by examiner

*Primary Examiner* — Amara Abdi
(74) *Attorney, Agent, or Firm* — Canon USA Inc., IP Division

(57) ABSTRACT

The present invention relates to the method for updating scene model and video surveillance. A method is provided for updating a scene model in a video which is composed of a plurality of visual elements, comprising: a classifying step for classifying the visual elements in a scene into stationary visual elements and moving visual elements according to their appearance change rates; a border determining step for determining borders from the scene according to a spatial distribution information of the stationary visual elements and the moving visual elements; and an updating step for updating the scene model according to the determined borders in said scene.

22 Claims, 13 Drawing Sheets

Method in US2012/0163658     vs     Our Method

Method in US2012/0163658     vs     Our Method

METHOD AND APPARATUS FOR UPDATING SCENE MODEL AND VIDEO SURVEILLANCE

BACKGROUND OF THE INVENTION

Field of the Invention

The present invention relates to image processing, in particular, to object detection in video images, and more particular, to foreground/background separation.

Description of the Related Art

A video is a sequence of images. The images are also referred to as frames. The terms "frame" and "image" are used interchangeably throughout this specification to describe a single image in an image sequence.

Scene modelling, also known as background modelling, involves the modelling of the visual content of a scene, based on an image sequence depicting the scene. The content typically includes foreground content and background content, for which a distinction or separation of the two is often desired.

In the intelligent surveillance field, it is popular to use foreground/background separation to detect the foreground object in the scene. A scene is composed of several visual elements and each visual element may have several possible appearances. Visual elements may be, for example, pixels or 8*8 DCT (Discrete Cosine Transform) blocks, as used in JPEG images.

In one foreground object detecting method of the prior art, the foreground object is separated from the background by analyzing the appearance age of the visual elements. If the appearance age of the visual element in one state is greater than a predefined threshold, this visual element will be recognized as the background.

However, the above method cannot separate the moving foreground object from the stationary foreground object accurately, for example in the case that there is an abandoned object in the background as shown in FIGS. 1A-1C. As shown in FIG. 1A, a lobby is monitored. In FIG. 1B, a bag is abandoned on the floor. In FIG. 1C, a person is passing by the bag. It is expected that only the moving person will be identified as the foreground object, and the bag can be separated from the person. However, with the above method in the prior art, both the moving person and the bag will be detected as foreground, and will be outputted as one object. Therefore, an approach is needed to distinguish the moving foreground object from the stationary foreground object (such as the abandoned object), and furthermore, to find the border between them.

A method proposed in US2012/0163658 can resolve the problem that moving objects detection cannot separate the moving foreground object from stationary foreground object (abandoned object). This invention enables the separation of the moving foreground object from stationary foreground object in a short time using a less memory capacity. In the method of US2012/0163658, the moving foreground object can be separated from the stationary foreground object by analyzing the co-occurrence rate between the appearances of the visual element pair.

FIGS. 2A-2C show the principle of the method of US2012/0163658. As shown in FIG. 2 A, two adjoining visual elements A and B are selected, and current appearances of the visual elements A and B are identified as planes 1 and 1', respectively. Since the appearances of the visual elements A and B are not changed in FIG. 2A, it is determined that these two visual elements A and B have a high co-occurrence rate, and thus they are connective. In FIG. 2B, a bag is abandoned on the floor. Both appearances of the visual elements A and B are changed to planes 2 and 2' from planes 1 and 1', respectively. Since the appearances of the visual elements A and B are both changed, it is determined that these two visual elements A and B have a high co-occurrence rate, and thus they are connective. In FIG. 2C, a person is passing by the bag. The appearance of visual element A is not changed, and maintains in plane 2. However, the appearance of visual element B is changed from plane 2' to plane 3', that is, a new appearance of visual element B will be identified. Accordingly, it is determined that these two visual elements A and B have a low co-occurrence rate, and thus they are un-connective. The border between the moving object and the stationary object can be thus determined.

FIG. 3 shows the flowchart of method of US2012/0163658 in the prior art. As shown in FIG. 3, in step 110, the co-occurrence rate of the appearances of the visual elements in each visual element pair is calculated. In step 120, the connection relationship between the visual elements in each visual element pair is determined based on the co-occurrence rate calculated in step 110. In step 130, the scene model is updated according to the connection relationships among the visual elements.

The method of US2012/0163658 can distinguish the moving foreground object from the stationary foreground object, but there are still some problems in this method. Because the determination in the method of US2012/0163658 depends on the accuracy of the co-occurrence information of adjoining visual elements' appearances, when the amount of noise is considerable, "Lack of segmentation" and "Over segmentation", which are not desired, may happen. FIG. 4A shows the phenomenon of "Lack of segmentation" in the method of US2012/0163658 of the prior art. FIG. 4B shows the phenomenon of "Over segmentation" in the method of US2012/0163658 of the prior art.

As shown in FIG. 4A, because the leg of the person and the bag are in a similar color, when the leg of the person is adjacent to the bag, no new appearance will be identified for the corresponding visual element. Accordingly, the co-occurrence rate between appearances of the adjoining visual elements is high, and they will be determined as connected incorrectly. In other words, the border between the leg of the person and the bag cannot be distinguished. This issue is the so-called "Lack of segmentation".

As shown in FIG. 4B, because the light changing brings different effects to different parts of the person, for example, in the upper half of the person, a new appearance for the visual element can be identified, but in the lower half of the person, no new appearance can be identified for the visual element. So the co-occurrence rate between appearances of the upper half and the lower half is low, and these two portions will be determined as un-connected incorrectly. This issue is the so-called "Over segmentation".

Therefore, it is desired to propose a new technique to address at least one of the problems in the prior art.

SUMMARY OF THE INVENTION

An object of the present invention is to separate the moving object from the stationary object accurately.

Another object of the present invention is to improve the robustness against the noises in the process of foreground/background separation.

According to a first aspect of the present invention, there is provided a method for updating a scene model in a video which is composed of a plurality of visual elements, comprising: a classifying step for classifying the visual elements in a scene into stationary visual elements and moving visual elements according to their appearance change rates; a border determining step for determining borders from the scene according to a spatial distribution information of the stationary visual elements and the moving visual elements; and an updating step for updating the scene model according to the determined borders in said scene.

According to another aspect of the present invention, there is provided a method for video surveillance, comprising: obtaining a video; updating a scene model in the video according to the above method; and detecting a foreground object in the video.

According to another aspect of the present invention, there is provided an apparatus for updating a scene model in a video which is composed of a plurality of visual elements, comprising: a classifying unit for classifying the visual elements in a scene into stationary visual elements and moving visual elements according to their appearance change rates; a border determining unit for determining borders from the scene according to a spatial distribution information of the stationary visual elements and the moving visual elements; and an updating unit for updating the scene model according to the determined borders in said scene.

According to another aspect of the present invention, there is provided an apparatus for video surveillance, comprising: an obtaining unit for obtaining a video; the above apparatus for updating a scene model in a video; and a detecting unit for detecting a foreground object in the video.

One of the advantages of the present invention is in that, the moving object can be separated from the stationary object accurately.

Another advantage of the present invention is in that, the robustness against the noises can be improved in the process of foreground/background separation.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1A:
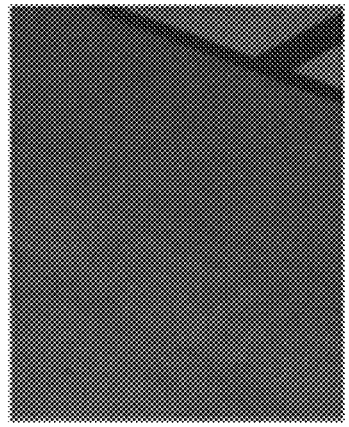
FIGS. 1A-1C show the environment being monitored for separating the foreground from the background.
Figure 1B:
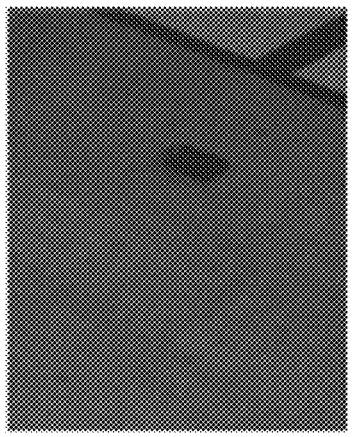
Figure 1C:
Figure 2C:
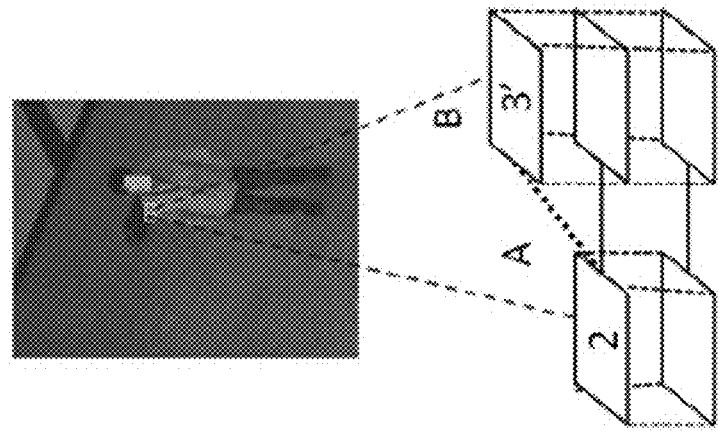
FIGS. 2A-2C show the principle of the method of US2012/0163658.
Figure 2B:
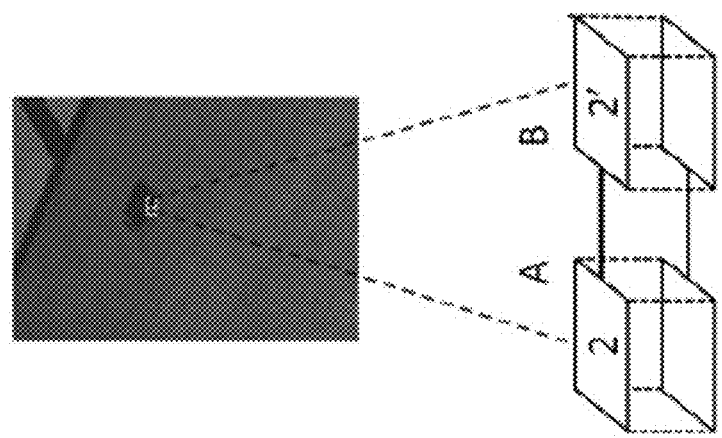
Figure 2A:
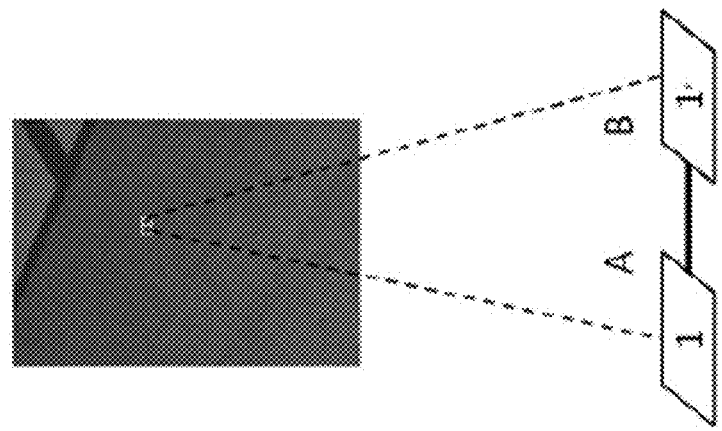
Figure 3:
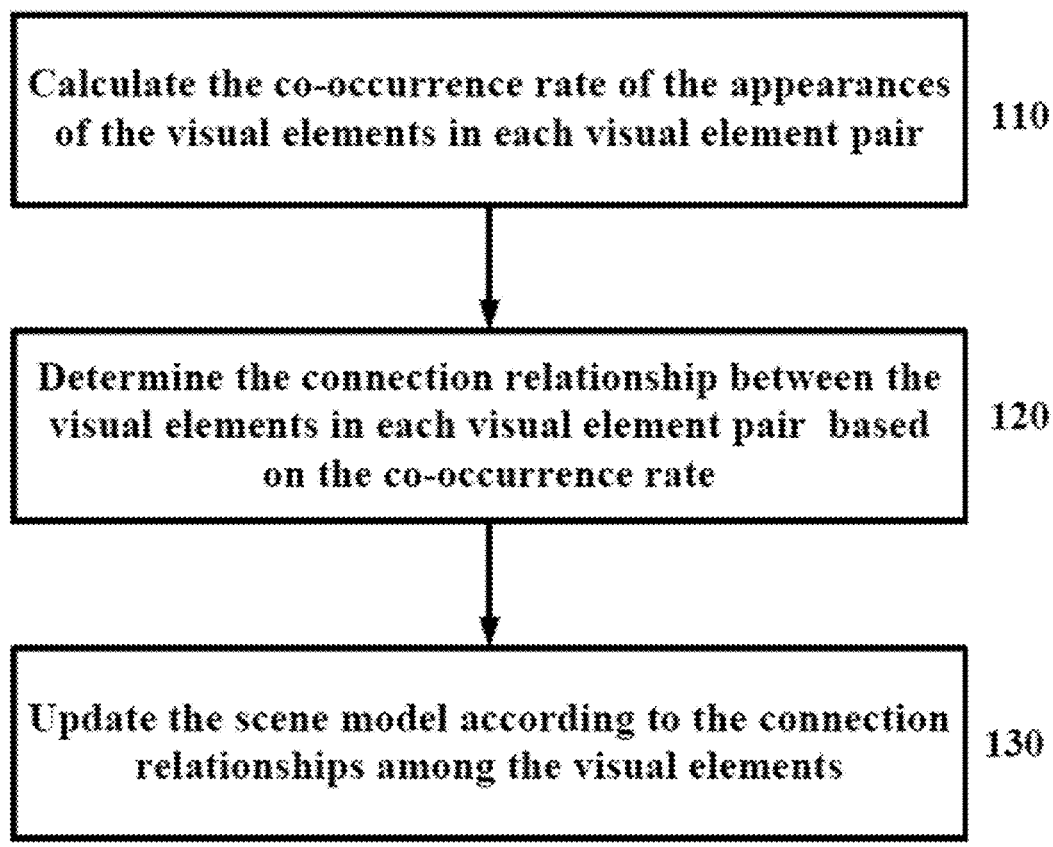
FIG. 3 shows the flowchart of the method of US2012/0163658 in the prior art.
Figure 4A:
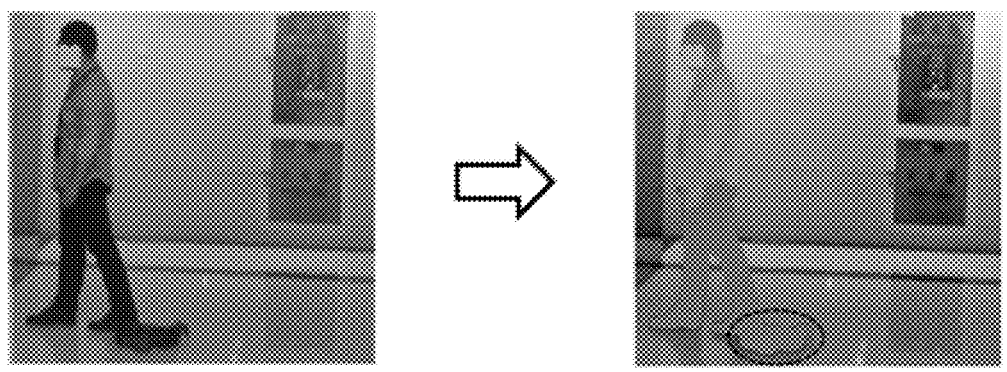
FIG. 4A shows the phenomenon of "Lack of segmentation" in the method of US2012/0163658 of the prior art.
Figure 4B:
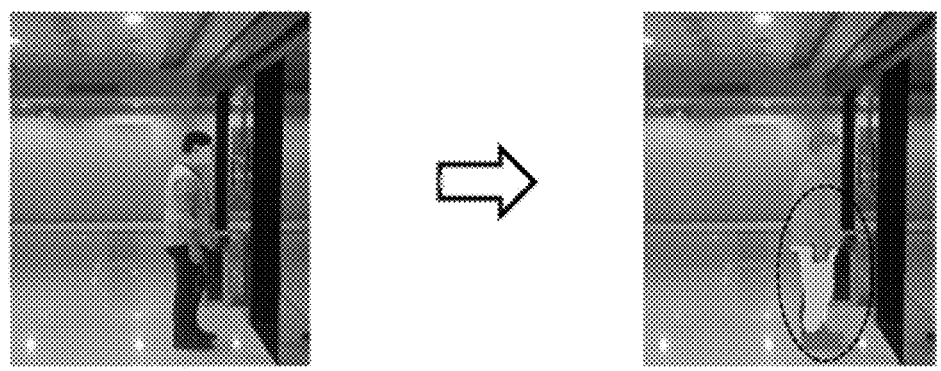
FIG. 4B shows the phenomenon of "Over segmentation" in the method of US2012/0163658 of the prior art.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 5:
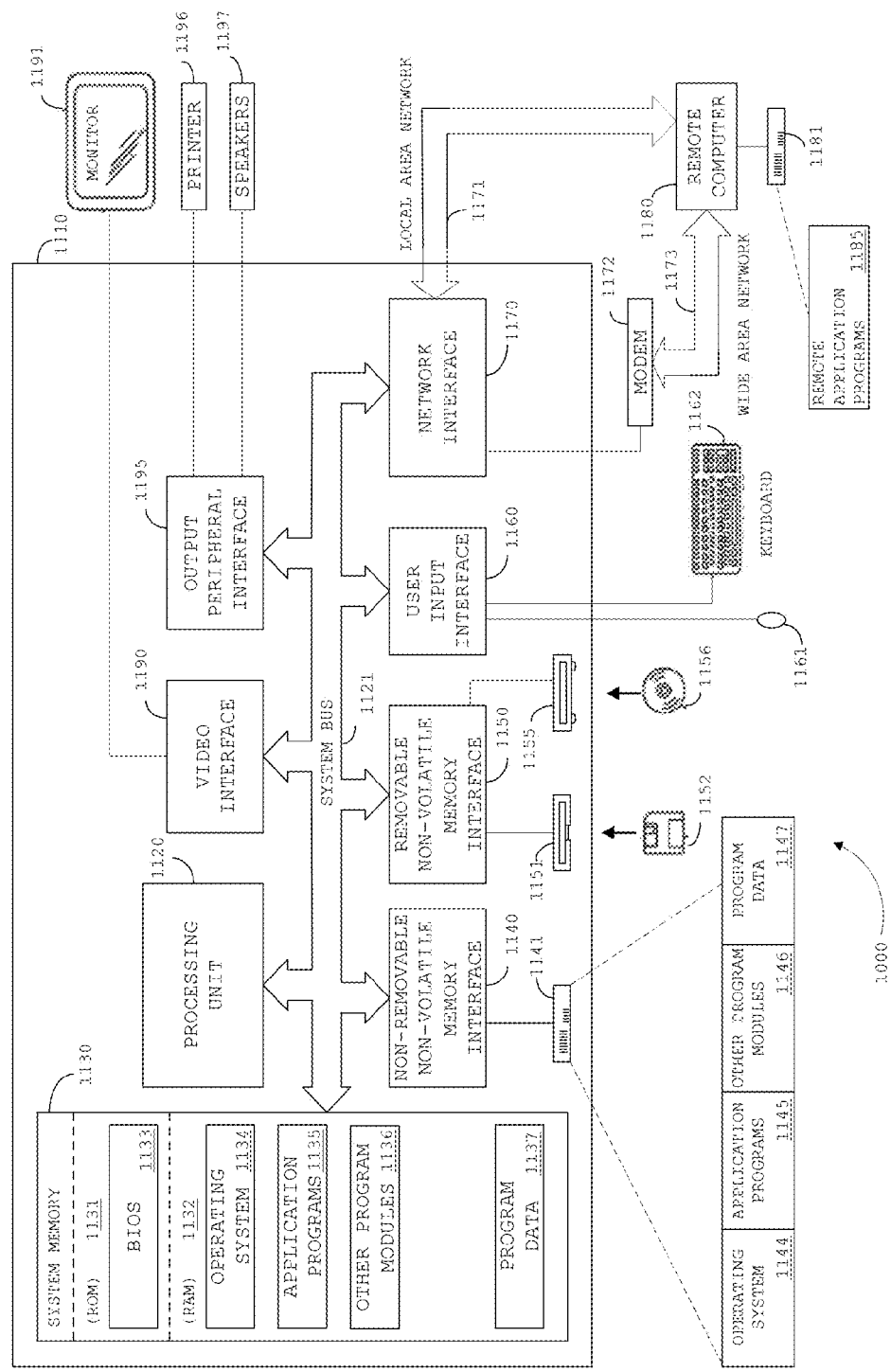
FIG. 5 is a schematic block diagram showing a hardware configuration of a computer system 1000 which can implement the embodiments of the present invention.

FIG. 5 is a schematic block diagram showing a hardware configuration of a computer system 1000 which can implement the embodiments of the present invention.

As shown in FIG. 5, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 5 is merely illustrative and is in no way intended to limit the invention, its application, or uses.

The computer system shown in FIG. 5 may be implemented to any of the embodiments, either as a stand-alone computer, or as a processing system in an apparatus, possibly with one or more unnecessary components removed or with one or more additional components added.

Figure 6:
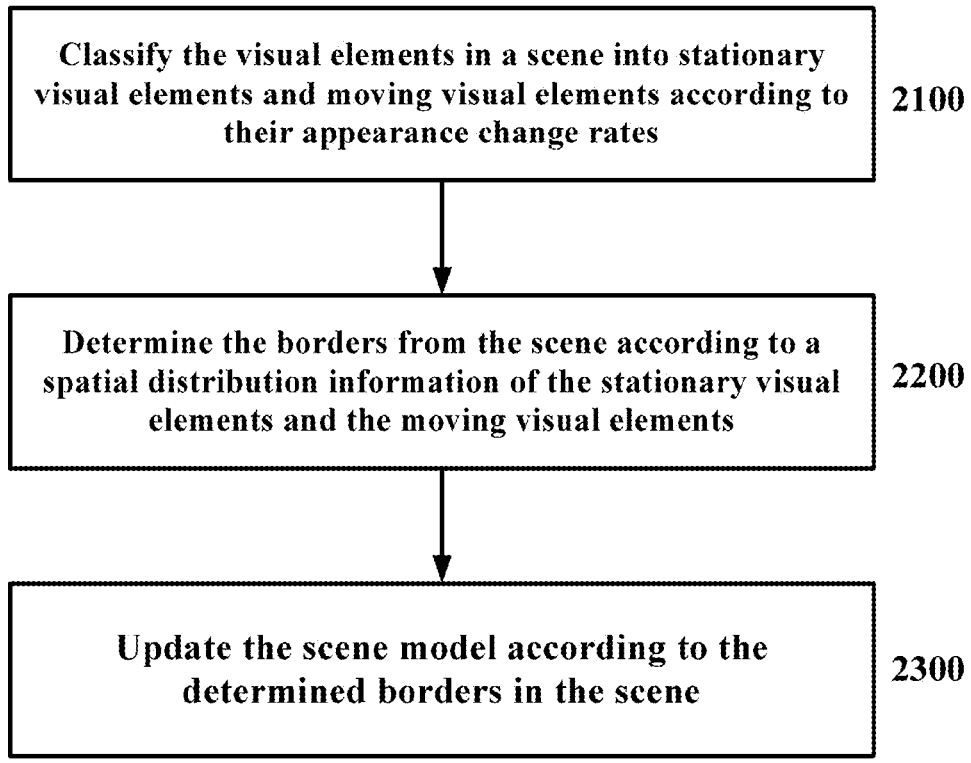
FIG. 6 shows the flowchart of the method for updating a scene model according to an embodiment of the present invention.

FIG. 6 shows the flowchart of the method for updating a scene model according to an embodiment of the present invention. As shown in step 2100, the visual elements in a scene are classified into stationary visual elements and moving visual elements according to their appearance change rates. In the present invention, the visual element may be a single pixel or a group of adjoined pixels.

Figure 7:
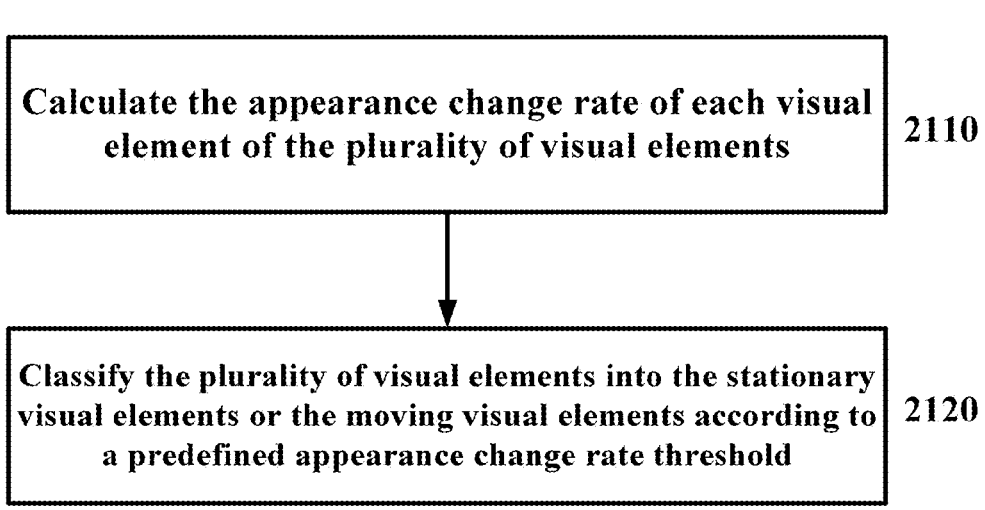
FIG. 7 shows the flowchart of the process for classifying the visual elements into stationary visual elements and moving visual elements according to an embodiment of the present invention.

FIG. 7 shows the flowchart of the method for classifying the visual elements into stationary visual elements and moving visual elements according to an embodiment of the present invention. As shown in FIG. 7, in step 2110, the appearance change rate of each visual element of the plurality of visual elements is calculated. In one embodiment, the appearance change rate of the visual element is calculated based on changes of said visual element in multiple frames in a predefined time period. Additionally and/or alternatively, the appearance change rate of the visual element may be calculated using a pixel value of the single pixel or an average pixel value of the group of adjoined pixels. That is, the appearance change rate may be calculated by comparing a pixel value of the single pixel or an average pixel value of the group of adjoined pixels. Note that, those skilled in the art can clearly understand that the appearance change rate may be calculated using other feature values of the pixel or the group of adjoined pixels.

Figure 8:
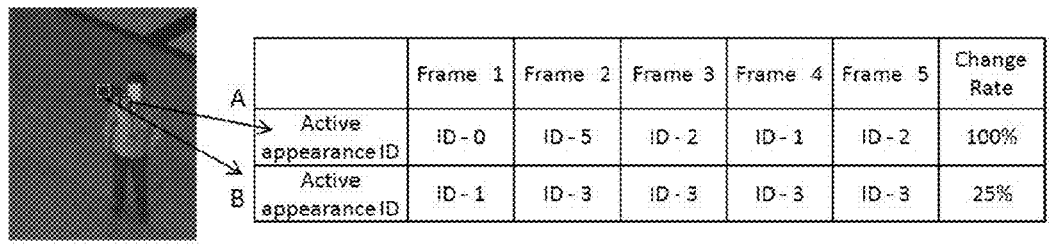
FIG. 8 shows a schematic diagram of the process for calculating the appearance change rate of the visual elements according to one embodiment of the present invention.

FIG. 8 shows a schematic diagram of the method for calculating the appearance change rate of the visual elements according to one embodiment of the present invention. In this embodiment, the appearance change rate of the visual element is calculated based on a changing number of said visual element between every two neighboring frames in multiple frames in a predefined time period. Note that, in this embodiment, the calculation is directed to the visual elements whose appearances have changed in the predetermined number of frames. The visual elements whose appearances have not changed in the predetermined number of frames will be recognized as the background objects. However, those skilled in the art can clearly understand that the method of the present invention can be applied to all the visual elements in the image.

As shown in FIG. 8, two visual elements are labeled as "A" and "B", respectively. For example, the appearance change rate of the visual element is calculated for a time period of 5 frames. In this embodiment, if the pixel values of the single pixel or the average pixel values of the group of adjoined pixels in different frames are identical, the appearance IDs in these frames will be identical. The appearances of the visual element "A" in the 5 frames are "ID-0", "ID-5", "ID-2", "ID-1" and "ID-2". That is, the appearances of the visual element "A" in the 5 frames are changed from "ID-0" to "ID-5", then to "ID-2", then to "ID-1" and finally to "ID-2". Accordingly, the appearance change rate of the visual element "A" is 100%.

The appearances of the visual element "B" in the 5 frames are "ID-1", "ID-3", "ID-3", "ID-3" and "ID-3". That is, the appearances of the visual element "B" in the 5 frames are changed from "ID-1" to "ID-3", and then maintain unchanged in the remaining frames. Accordingly, the appearance change rate of the visual element "B" is 25%.

Note that, those skilled in the art can clearly understand that the appearance change rate of the visual element can be calculated based on changes of the visual element in multiple frames in a predefined time period by using other methods.

For example, if there are 10 frames in the predefined time period. As to the visual element of interest, the average value of the pixel values of the single pixel or the average pixel values of the group of adjoined pixels in 10 frames can be calculated. As to the visual element in one frame, if the difference between the calculated average value and the pixel value of the single pixel or the average pixel value of the group of adjoined pixels in this frame is greater than a predefined threshold, this frame can be identified as changed. The appearance change rate may be calculated as a ratio of the number of the changed frames to the total number of the frames. Similarly, other methods may also be employed to calculate the appearance change rate of the visual element based on changes of the visual element in multiple frames in a predefined time period.

Referring back to FIG. 7, in step 2120, the plurality of visual elements are classified into the stationary visual elements or the moving visual elements according to a predefined appearance change rate threshold. If the appearance change rate of a visual element is greater than or equal to the appearance change rate threshold, this visual element will be determined as the moving visual element. If the appearance change rate of a visual element is less than the appearance change rate threshold, this visual element will be determined as the stationary visual element. The appearance change rate threshold is set in advance according to the experience of those skilled in the art or according to a plurality of experiments. In one embodiment, the appearance change rate threshold may be selected as 67%. Note that, those skilled in the art can clearly understand that the appearance change rate threshold may be selected as other value, such as 50%, 60%, 70%, 80%, 90%, etc.

With the method for classifying the visual elements, the visual elements in a scene can be classified into the stationary visual elements and the moving visual elements.

Figure 9:
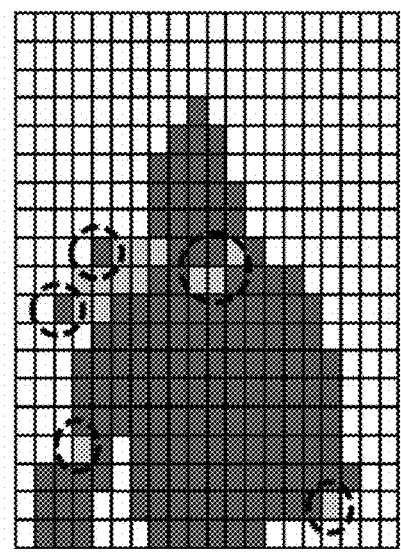
FIG. 9 shows the exemplary classifying result using the method of FIG. 7 and FIG. 8.

FIG. 9 shows the exemplary classifying result using the process of FIG. 7 and FIG. 8. As mentioned above, in this embodiment, the classifying is directed to the visual elements whose appearances have changed in the predetermined number of frames. The visual elements whose appearances have not changed in the predetermined number of frames will be recognized as the background objects directly. However, those skilled in the art can clearly understand that the method of the present invention can be applied to all the visual elements in the image.

As shown in FIG. 9, the visual elements whose appearances have not changed in the predetermined number of frames are filled with white; the stationary visual elements are filled with a shallow color; and the moving visual elements are filled with a dark color. In this figure, some visual elements which are classified incorrectly are marked with circles. This wrong classification is caused by the noises. In the later description, the method of the present invention attempts to reduce the side effect of the wrong classification by using the spatial distribution information of the visual elements.

Referring back to FIG. 6, in step 2200, the borders are determined from the scene according to the spatial distribution information of the stationary visual elements and the moving visual elements.

Figure 10:
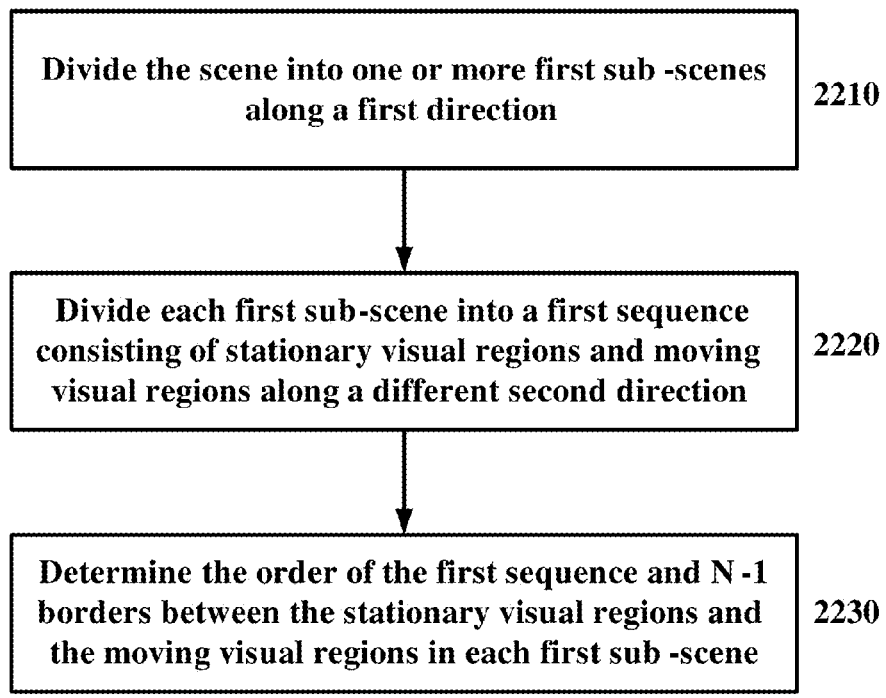
FIG. 10 shows the flowchart of the process for determining borders from the scene according to an embodiment of the present invention.

FIG. 10 shows the flowchart of the process for determining borders from the scene according to an embodiment of the present invention. As shown in FIG. 10, in step 2210, the scene is divided into one or more first sub-scenes along a first direction. In one embodiment, the first direction may be the vertical direction. Note that, those skilled in the art can clearly understand that other direction (such as horizontal direction and the diagonal direction, etc.) can also be selected as the first direction. Additionally and/or alternatively, one first sub-scene may be one row of pixels. However, those skilled in the art can clearly understand that the method of the present invention can be applied to the sub-scene with other size, even with an adaptive size.

Next, in step 2220, each first sub-scene is divided into a first sequence consisting of stationary visual regions and moving visual regions along a different second direction, wherein the stationary visual regions and the moving visual regions are alternating with each other, and a total number of the stationary visual regions and the moving visual regions is N, which is an integer equal to or greater than 2. For example, the second direction may be the direction perpendicular with the first direction. For example, the second direction may be horizontal direction. In addition, the second direction may be the direction at an acute angle with the first direction.

In one example, it can be supposed that a first sub-scene is composed of a sequence of one stationary visual region and one moving visual region. That is, the total number of the stationary visual regions and the moving visual regions is 2.

In another example, it can be supposed that a first sub-scene is composed of a sequence of one stationary visual region, one moving visual region and one stationary visual region, or a sequence of one moving visual region, one stationary visual region and one moving visual region. That is, the total number of the stationary visual regions and the moving visual regions is 3, and the stationary visual regions and the moving visual regions are alternating with each other.

Note that, those skilled in the art can clearly understand that the total number of the stationary visual regions and the moving visual regions in the sequence can be an arbitrary integer greater than or equal to 2. In addition, it is required that the stationary visual regions and the moving visual regions are alternating with each other in the present invention. Since the stationary visual regions and the moving visual regions are alternating with each other, there may be only two kind of order for the sequence, i.e., a case where a stationary visual region is in the first place, or a case where a moving visual region is in the first place.

Next, in step 2230, the order of the first sequence and N−1 borders between the stationary visual regions and the moving visual regions in each first sub-scene are determined in such a manner that a sum of densities of the stationary visual elements in each of stationary visual regions and densities of the moving visual elements in each of moving visual regions is a maximum value.

Figure 11:
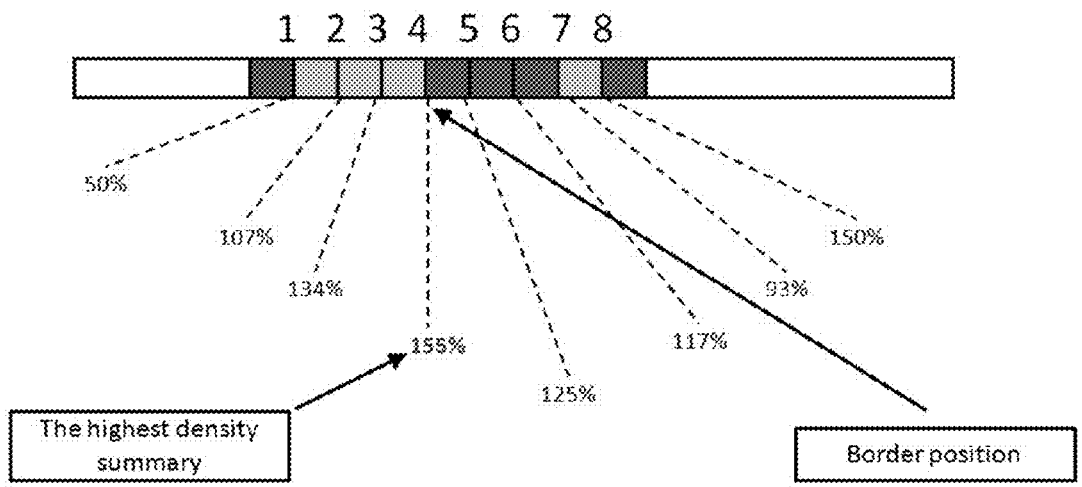
FIG. 11 shows a schematic diagram of an example of determining the order of the first sequence and the border between the stationary visual region and the moving visual region.

FIG. 11 shows a schematic diagram of an example for determining the order of the first sequence and the border between the stationary visual region and the moving visual region. In FIG. 11, the visual elements whose appearances have not changed in the predetermined number of frames are filled with white; the stationary visual elements are filled with a shallow color; and the moving visual elements are filled with a dark color.

In this example, similarly as the example of FIG. 8, our process is only directed to the visual elements whose appearances have changed in the predetermined number of frames for convenience. The visual elements whose appearances have not changed in the predetermined number of frames will be recognized as the background objects. However, those skilled in the art can clearly understand that the process of the present invention can be applied to all the visual elements in the image.

In FIG. 11, there are 9 visual elements whose appearances have changed. It is supposed that there are one stationary visual region and one moving visual region in the sequence. That is, the total number of the stationary visual regions and the moving visual regions is two. The boundaries between the adjoining visual elements are labeled as positions "1"-"8". Next, we will determine the boundary of the stationary visual region and the moving visual region from positions "1"-"8", that is, select one position from positions "1"-"8" as the boundary of the stationary visual region and the moving visual region.

It is firstly supposed that the stationary visual region is followed by the moving visual region in the sequence. For each position of positions "1"-"8", with the premise that this position is the boundary of the stationary visual region and the moving visual region, a sum of the density of the stationary visual elements in the stationary visual region and the density of the moving visual elements in the moving visual region is calculated.

For example, if position "1" is the boundary of the stationary visual region and the moving visual region, in the stationary visual region (the left side to position "1"), there is one moving visual element and there is no stationary visual element. So the density of the stationary visual elements in the stationary visual region is 0. In the moving visual region (the right side to position "1"), there are four moving visual elements and four stationary visual elements.

So the density of the moving visual elements in the moving visual region is 50%. The sum of the above two densities is 50%.

For example, if position "4" is the boundary of the stationary visual region and the moving visual region, in the stationary visual region (the left side to position "4"), there are one moving visual element and three stationary visual elements. So the density of the stationary visual elements in the stationary visual region is 75%. In the moving visual region (the right side to position "4"), there are four moving visual elements and one stationary visual element. So the density of the moving visual elements in the moving visual region is 80%. The sum of the above two densities is 155%.

The sums of the density of the stationary visual elements in the stationary visual region and the density of the moving visual elements in the moving visual region for the case of the stationary visual region followed by the moving visual region in the sequence are labelled in FIG. 11.

Next, it is supposed that the moving visual region is followed by the stationary visual region in the sequence. A sum of the density of the stationary visual elements in the stationary visual region and the density of the moving visual elements in the moving visual region is then calculated for each position in this case.

After calculation, it can be determined that the sum of the two densities at position "4" in the case of the stationary visual region followed by the moving visual region is the maximum. Accordingly, the sequence can be determined as the stationary visual region followed by the moving visual region, and the border of the stationary visual region and the moving visual region can be determined at position "4".

Note that, the example of determining the order of the sequence and the border between the stationary visual regions and the moving visual regions are described above for one stationary visual region and one moving visual region. Those skilled in the art can clearly understand that the above process can be applied to a plurality of stationary visual regions and the moving visual regions. That is, the total number of the stationary visual regions and the moving visual regions may be three or more.

The above process determines the order of the sequence and the border between the stationary visual regions and the moving visual regions along one direction. Additionally, we may also repeat this process in another direction to determine the order of the sequence and the border between the stationary visual regions and the moving visual regions in the other direction. In particular, the scene may be divided into one or more second sub-scenes along the second direction. Each second sub-scene may be divided into a second sequence consisting of stationary visual regions and moving visual regions along the first direction, wherein the stationary visual regions and the moving visual regions are alternating with other, and a total number of the stationary visual regions and the moving visual regions is M, which is an integer equal to or greater than 2. A order of the second sequence and M−1 borders between the stationary visual regions and the moving visual regions in each second sub-scene may be then determined in such a manner that a sum of densities of the stationary visual elements in each of stationary visual regions and densities of the moving visual elements in each of moving visual regions is a maximum value.

Note that, those skilled in the art can clearly understand that the process along the second direction is not necessarily required for our method.

Referring back to FIG. 6, in step 2300, the scene model is updated according to the determined borders in the scene.

Figure 12:
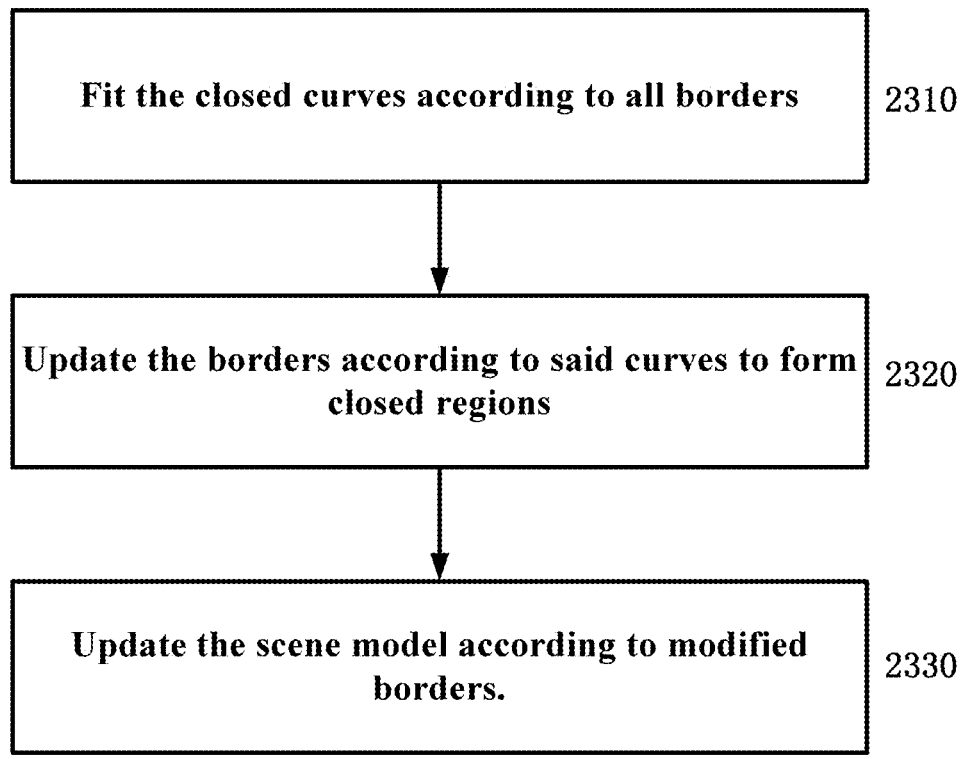
FIG. 12 shows the flowchart of the process for updating the scene model according to the determined borders in scene according to an embodiment of the present invention.

FIG. 12 shows the flowchart of the process for updating the scene model according to the determined borders in scene according to an embodiment of the present invention.

Figure 13:
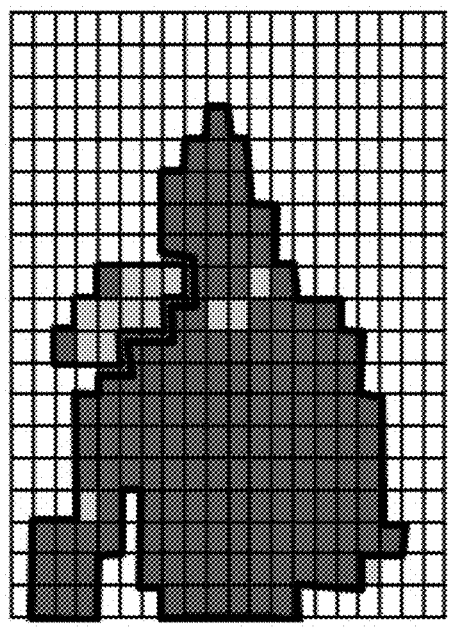
FIG. 13 shows the fitting result of the example of scene in FIG. 9.

As shown in FIG. 12, in step 2310, the closed curves are fitted according to all borders. In one embodiment, the closed curve is fitted in such a manner that the curve is as smooth as possible. The method for fitting the closed curves according to all borders are known to those skilled in the art, so the detailed description thereof is omitted. FIG. 13 shows the fitting result of the example of scene in FIG. 9. It can be seen from FIG. 13, the moving person and the bag abandoned in the background are separated.

Next, in step 2320, the borders are updated according to said curves to form closed regions, wherein the stationary visual elements or the moving visual elements are dominant in each closed region. In this step, some borders which are generated due to error can be removed. For example, a border within a closed region can be removed.

Next, in step 2330, the scene model can be updated according to modified borders. A more accurate modified scene model may be thus obtained.

Figure 14:
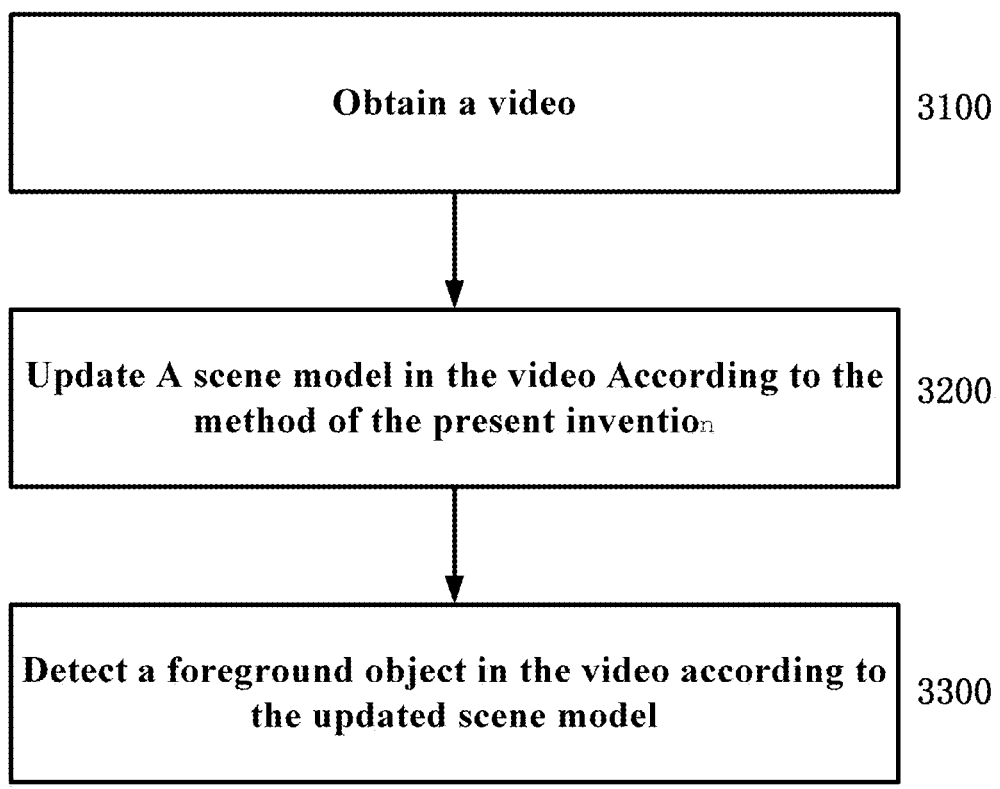
FIG. 14 shows the flowchart of the method for video surveillance according to an embodiment of the present invention.

The above-described method for updating a scene model in a video can be used in the field of video surveillance. FIG. 14 shows the flowchart of the method for video surveillance according to an embodiment of the present invention.

As shown in FIG. 14, first in step 3100, a video may be obtained. Next, in step 3200, a scene model in the video may be updated according to the above-described method for updating a scene model in a video. Next, in step 3300, a foreground object in the video may be detected according to the updated scene model. Since the accuracy of the scene model in the video is higher than those obtained by the method of the prior art, the detecting result of video surveillance can be improved over the method in the prior art.

Figure 15:
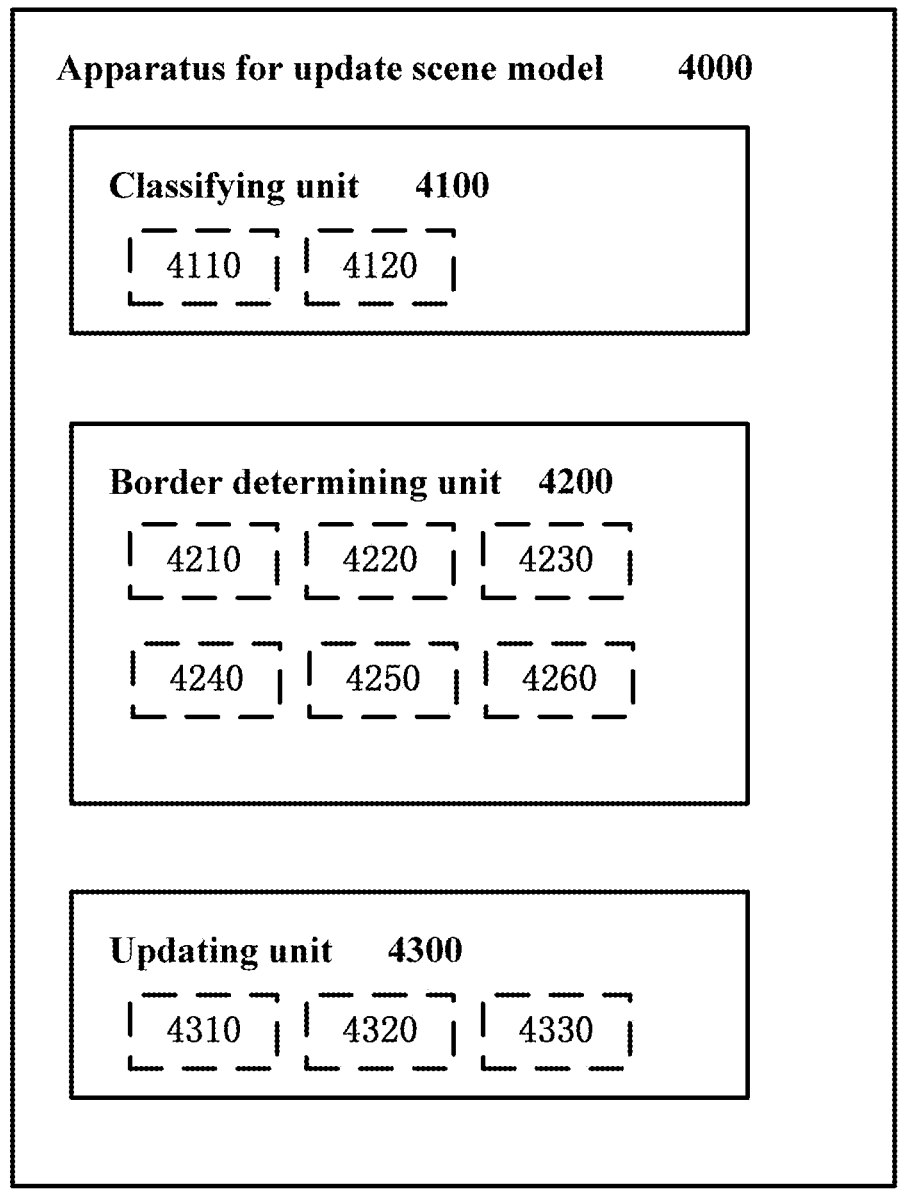
FIG. 15 shows a functional block diagram of an apparatus 4000 for updating a scene model in a video according to an embodiment of the present invention.

FIG. 15 shows a functional block diagram of an apparatus 4000 for updating a scene model in a video according to an embodiment of the present invention. All the functional blocks of the apparatus 4000 (various units included in the apparatus 4000, whether shown or not shown in the figure) may be implemented by hardware, software, or a combination of hardware and software to carry out the principles of the invention. It is understood by those skilled in the art that the functional blocks described in FIG. 15 may be combined or separated into sub-blocks to implement the principles of the invention as described above. Therefore, the description herein may support any possible combination or separation or further definition of the functional blocks described herein.

As shown in FIG. 15, according to one aspect of the present invention, the apparatus 4000 for updating a scene model in a video may comprise a classifying unit 4100, a border determining unit 4200 and an updating unit 4300. The scene model is composed of a plurality of visual elements. The classifying unit 4100 may be configured to classify the visual elements in a scene into stationary visual elements and moving visual elements according to their appearance change rates. The border determining unit 4200 may be configured to determine borders from the scene according to a spatial distribution information of the stationary visual elements and the moving visual elements. The updating unit 4300 may be configured to update the scene model according to the determined borders in said scene.

In one embodiment, the visual element may be a single pixel or a group of adjoined pixels.

In one embodiment, the classifying unit 4100 may further comprise: a calculating unit 4110 and a stationary/moving visual element classifying subunit 4120. The calculating unit

4110 may be configured to calculate the appearance change rate of said plurality of visual elements. The stationary/moving visual element classifying subunit 4120 may be configured to classify said plurality of visual elements into the stationary visual elements or the moving visual elements according to a predefined appearance change rate threshold.

In one embodiment, the predefined appearance change rate threshold may be 67%.

In one embodiment, the appearance change rate of the visual element may be calculated based on changes of said visual element in multiple frames in a predefined time period.

In one embodiment, the appearance change rate of the visual element is calculated based on a changing number of said visual element between every two neighboring frames in multiple frames in a predefined time period.

In one embodiment, the appearance change rate of the visual element may be calculated using a pixel value of the single pixel or an average pixel value of the group of adjoined pixels.

In one embodiment, the border determining unit 4200 may further comprise: a first dividing unit 4210, a second dividing unit 4220 and a first order and border determining unit 4230. The first dividing unit 4210 is configured to divide the scene into one or more first sub-scenes along a first direction. The second dividing unit 4220 may be configured to divide each first sub-scene into a first sequence consisting of stationary visual regions and moving visual regions along a different second direction, wherein the stationary visual regions and the moving visual regions are alternating with each other, and a total number of the stationary visual regions and the moving visual regions is N, which is an integer equal to or greater than 2. The first order and border determining unit 4230 may be configured to determine a order of the first sequence and N−1 borders between the stationary visual regions and the moving visual regions in each first sub-scene in such a manner that a sum of densities of the stationary visual elements in each of stationary visual regions and densities of the moving visual elements in each of moving visual regions is a maximum value.

In one embodiment, the border determining unit 4200 may further comprise: a third dividing unit 4240, a fourth dividing unit 4250 and a second order and border determining unit 4260. The third dividing unit 4240 is configured to divide the scene into one or more second sub-scenes along the second direction. The fourth dividing unit 4250 is configured to divide each second sub-scene into a second sequence consisting of stationary visual regions and moving visual regions along the first direction, wherein the stationary visual regions and the moving visual regions are alternating with other, and a total number of the stationary visual regions and the moving visual regions is M, which is an integer equal to or greater than 2. The second order and border determining unit 4260 is configured to determine a order of the second sequence and M−1 borders between the stationary visual regions and the moving visual regions in each second sub-scene in such a manner that a sum of densities of the stationary visual elements in each of stationary visual regions and densities of the moving visual elements in each of moving visual regions is a maximum value.

In one embodiment, the updating unit 4300 may further comprise a fitting unit 4310, a modifying unit 4320 and a scene model updating unit 4330. The fitting unit 4310 is configured to fit closed curves according to all borders. The modifying unit 4320 is configured to modify the borders according to said curves to form closed regions, wherein the stationary visual elements or the moving visual elements are dominant in each closed region. The scene model updating unit 4330 is configured to update the scene model according to modified borders.

In one embodiment, the closed curve may be fitted in such a manner that the curve is as smooth as possible.

Figure 16:
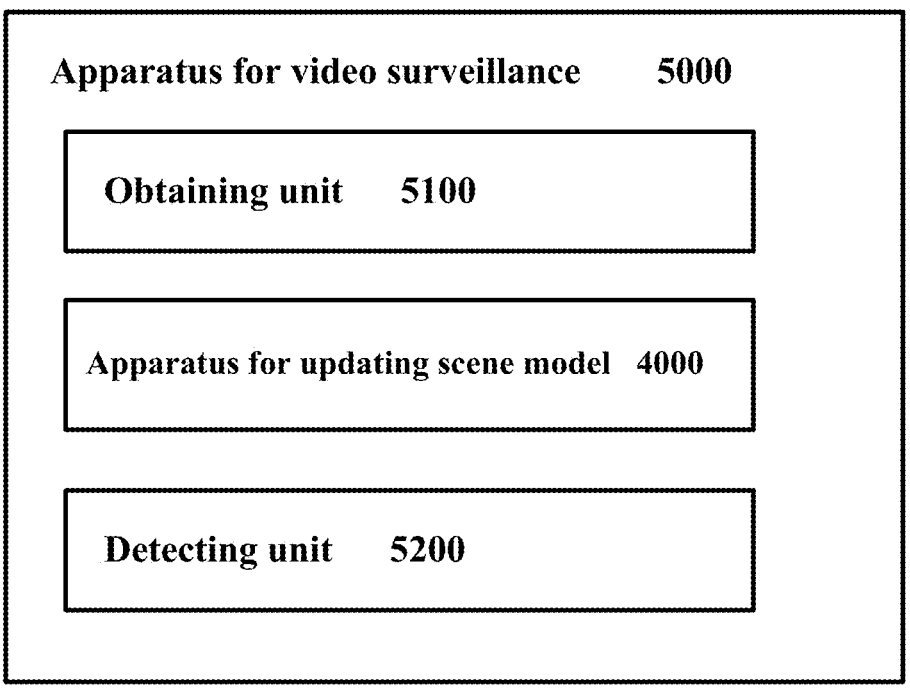
FIG. 16 shows a functional block diagram of an apparatus 5000 for video surveillance according to an embodiment of the present invention.

FIG. 16 shows a functional block diagram of an apparatus 5000 for video surveillance according to an embodiment of the present invention. All the functional blocks of the apparatus 5000 (various units included in the apparatus 5000, whether shown or not shown in the figure) may be implemented by hardware, software, or a combination of hardware and software to carry out the principles of the invention. It is understood by those skilled in the art that the functional blocks described in FIG. 16 may be combined or separated into sub-blocks to implement the principles of the invention as described above. Therefore, the description herein may support any possible combination or separation or further definition of the functional blocks described herein.

As shown in FIG. 16, according to one aspect of the present invention, the apparatus 5000 for video surveillance may comprise: an obtaining unit 5100, the above-described apparatus for updating a scene model in a video 4000, and a detecting unit 5200. The obtaining unit may be configured to obtain a video. The apparatus for updating a scene model in a video 4000 may be configured to updating the scene model in the video. The detecting unit 5200 may be configured to detect a foreground object in the video according to the updated scene model.

In addition, according to another aspect of the present invention, an apparatus for updating a scene model in a video composed of a plurality of visual elements may be provided. The apparatus may comprise a processor and a memory having instructions stored thereon, which, when executed by the processor, causes the processor to perform operations: classifying the visual elements in a scene into stationary visual elements and moving visual elements according to their appearance change rates; determining borders from the scene according to a spatial distribution information of the stationary visual elements and the moving visual elements; and updating the scene model according to the determined borders in said scene.

In one embodiment, the visual element may be a single pixel or a group of adjoined pixels.

In one embodiment, the instruction for classifying operation may further comprise instructions: calculating the appearance change rate of said plurality of visual elements; and classifying said plurality of visual elements into the stationary visual elements or the moving visual elements according to a predefined appearance change rate threshold.

In one embodiment, the predefined appearance change rate threshold is 67%. Through the experiments, this value is a good threshold to distinguish the stationary visual elements and the moving visual elements.

In one embodiment, the appearance change rate of the visual element is calculated based on changes of said visual element in multiple frames in a predefined time period.

In one embodiment, the appearance change rate of the visual element is calculated based on a changing number of said visual element between every two neighboring frames in multiple frames in a predefined time period.

In one embodiment, the appearance change rate of the visual element is calculated using a pixel value of the single pixel or an average pixel value of the group of adjoined pixels.

In one embodiment, the instruction for the border determining operation may further comprise instructions: dividing the scene into one or more first sub-scenes along a first direction; dividing each first sub-scene into a first sequence consisting of stationary visual regions and moving visual regions along a different second direction, wherein the stationary visual regions and the moving visual regions are alternating with each other, and a total number of the stationary visual regions and the moving visual regions is N, which is an integer equal to or greater than 2; and determining an order of the first sequence and N−1 borders between the stationary visual regions and the moving visual regions in each first sub-scene in such a manner that a sum of densities of the stationary visual elements in each of stationary visual regions and densities of the moving visual elements in each of moving visual regions is a maximum value.

In one embodiment, the instruction for the border determining operation may further comprise instructions: dividing the scene into one or more second sub-scenes along the second direction; dividing each second sub-scene into a second sequence consisting of stationary visual regions and moving visual regions along the first direction, wherein the stationary visual regions and the moving visual regions are alternating with other, and a total number of the stationary visual regions and the moving visual regions is M, which is an integer equal to or greater than 2; and determining an order of the second sequence and M−1 borders between the stationary visual regions and the moving visual regions in each second sub-scene in such a manner that a sum of densities of the stationary visual elements in each of stationary visual regions and densities of the moving visual elements in each of moving visual regions is a maximum value.

In one embodiment, the instruction for the updating operation may further comprise instructions: fitting closed curves according to all borders; modifying the borders according to said curves to form closed regions, wherein the stationary visual elements or the moving visual elements are dominant in each closed region; and updating the scene model according to modified borders.

In one embodiment, the closed curve may be fitted in such a manner that the curve is as smooth as possible.

Those skilled in the art can clearly understand that when the processor executes the instructions in the memory, the processor may act as the modules as shown in FIG. 15.

Performance comparison tests on the methods for updating a scene model in a video according to the present invention and the method of US2012/0163658 in the prior art Performance comparison tests of the methods for updating a scene model in a video according to the present invention and the method of US2012/0163658 in the prior art will be described below.

Total 1346 frames are used for the performance comparison tests of methods of the present invention and the method of US2012/0163658 in the prior art. Two kinds of measurements are performed: the measurement based on Object Association and the measurement based on Pixel Overlap.

For the measurement based on Object Association, three evaluation parameters may be defined as follows:

$$Precision = \frac{Detected\ Blobs \cap Blobs\ in\ Ground\ Truth}{Detected\ Blobs}$$

$$Recall = \frac{Detected\ Blobs \cap Blobs\ in\ Ground\ Truth}{Blobs\ in\ Ground\ Truth}$$

$$F1\ Score = 2 * \frac{Precision * Recall}{Precision + Recall}$$

In the above formulas, the parameter "Precision" refers to a ratio of the detected correct Blobs to all detected Blobs. The parameter "Recall" refers to a ratio of the detected correct Blobs to all correct Blobs in the ground truth. The parameter "F1 Score" shows a combination of the parameters "Precision" and "Recall".

For the measurement based on Pixel Overlap, other three evaluation parameters may be defined similarly as follows:

$$Precision = \frac{Detected\ Area \cap Ground\ Truth\ Area}{Detected\ Area}$$

$$Recall = \frac{Detected\ Area \cap Ground\ Truth\ Area}{Ground\ Truth\ Area}$$

$$F1\ Score = 2 * \frac{Precision * Recall}{Precision + Recall}$$

In the above formulas, the parameter "Precision" refers to a ratio of the detected correct area to all detected area. The parameter "Recall" refers to a ratio of the detected correct area to all correct area in the ground truth. The parameter "F1 Score" shows a combination of the parameters "Precision" and "Recall".

The same dataset and evaluation measurements are used to evaluate the method of US2012/0163658 in the prior art and the method of the present invention in PC. The configurations of the software and hardware for the performance comparison tests are shown in Table 1.

TABLE 1

Configurations of the software and hardware for the performance comparison tests

| | | |
|---|---|---|
| Software | OS | Win-7 professional, service pack 1 |
| | Application | VEP2-Test |
| | Compiler Vision | VC++ 2010 |
| Hardware | CPU | Intel Core(TM)2 Quad CPU, 2.40 GHz |
| | Memory | 4.00 GB |

Table 2 shows the comparison result of the performances of the method of US2012/0163658 and the method of the present invention.

TABLE 2

Comparison result of the performances of the method of US2012/0163658 and the method of the present invention

| | Measurement Based on Object Association | | | Measurement Based on Pixel Overlap | | | Speed |
|---|---|---|---|---|---|---|---|
| | Precision | Recall | F1 Score | Precision | Recall | F1 Score | (ms/frame) |
| method of US2012/0163658 | 0.45 | 0.827 | 0.638 | 0.717 | 0.838 | 0.777 | 35.79 |
| Our method | 0.536 | 0.824 | 0.68 | 0.757 | 0.886 | 0.822 | 22.68 |

It can be seen from Table 2, as to the measurement based on Object Association and the measurement based on Pixel Overlap, the parameters of Precision and F1 score of the method according to the present invention can be improved as compared to the method of US2012/0163658 in the prior art. In addition, as to the measurement based on Pixel Overlap, the parameter of recall of the method according to the present invention is also improved as compared to the method of US2012/0163658 in the prior art. Further, the calculation speed of the method of the present invention is faster than the method of US2012/0163658 in the prior art.

Figure 17A:
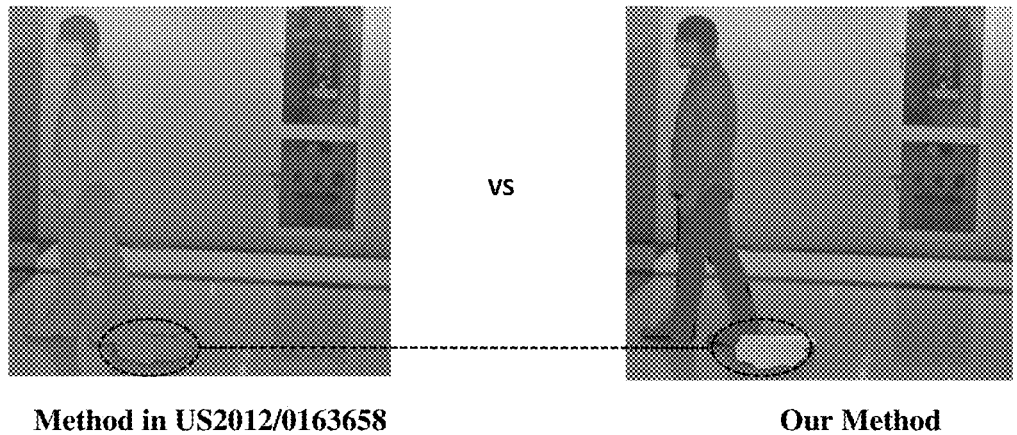
FIGS. 17A and 17B visually show the comparison result of the method according to the present invention and the method of US2012/0163658 in the prior art in foreground/background separation.
Figure 17B:
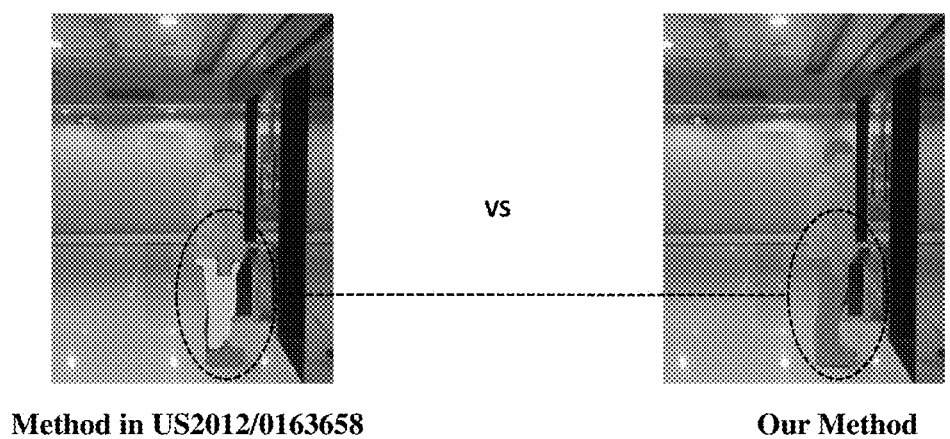

FIGS. 17A and 17B visually show the comparison result of the method according to the present invention and the method of US2012/0163658 in the prior art in foreground/background separation.

As shown in FIG. 17A, in the method of US2012/0163658, because the leg of the person and the bag are in a similar color, when the leg of the person is adjacent to the bag, the border between the leg of the person and the bag cannot be distinguished (that is, so-called "Lack of segmentation"). As shown in FIG. 17B, also in the method of US2012/0163658, because the light changing brings different effects to different parts of the person, the different portions in a person will be distinguished incorrectly as belonging to different objects (that is, so-called "Over segmentation").

However, with the method according to the present invention, "Lack of segmentation" and "Over segmentation" caused in the method of US2012/0163658 in the prior art can be eliminated. The objects (such as, the person and the bag) can be identified correctly.

According to the results of performance comparison tests, it can be concluded that the method according to the present invention is better than the method of US2012/0163658 in the prior art in the composite performance.

The advantages of the present invention are as follows:

(1) In the present invention, another kind of temporal information is used, which is more robust to the noises than the temporal information in prior art.

(2) In the present invention, not only the temporal information but also the spatial distribution information of the visual elements are considered.

(3) The borders of the objection are not determined based on the relationship between visual element pair, but based on the density distribution among all visual elements in a region, which make the method of the present invention more robust to noises.

It is possible to carry out the method and system of the present invention in many ways. For example, it is possible to carry out the method and system of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A method for updating a scene model in a video which is composed of a plurality of visual elements, comprising:
    a classifying step for classifying the visual elements in a scene into stationary visual elements and moving visual elements according to their appearance change rates;
    a border determining step for determining borders from the scene according to a spatial distribution information of the stationary visual elements and the moving visual elements elements wherein the spatial distribution information is a sum of a first density of the stationary visual elements at a side of a position and a second density of the moving visual elements at another side of the position and the position as the border is determined based on the sum of the first density and the second density; and
    an updating step for updating the scene model according to the determined borders in said scene.

2. The method according to claim 1, the visual elements is a single pixel or a group of adjoined pixels.

3. The method according to claim 1, wherein the classifying step further comprises:
    calculating the appearance change rate of said plurality of visual elements; and
    classifying said plurality of visual elements into the stationary visual elements or the moving visual elements according to a predefined appearance change rate threshold.

4. The method according to claim 3, wherein the appearance change rate of the visual element is calculated based on changes of said visual element in multiple frames in a predefined time period.

5. The method according to claim 4, wherein the appearance change rate of the visual element is calculated based on a changing number of said visual element between every two neighboring frames in multiple frames in a predefined time period.

6. The method according to claim 2, wherein the appearance change rate of the visual element is calculated using a pixel value of the single pixel or an average pixel value of the group of adjoined pixels.

7. The method according to claim 3, wherein the border determining step further comprises:
    dividing the scene into one or more first sub-scenes along a first direction;
    dividing each first sub-scene into a first sequence consisting of stationary visual regions and moving visual regions along a different second direction, wherein the stationary visual regions and the moving visual regions are alternating with each other, and a total number of the stationary visual regions and the moving visual regions is N, which is an integer equal to or greater than 2; and
    determining an order of the first sequence and N−1 borders between the stationary visual regions and the moving visual regions in each first sub-scene in such a manner that a sum of densities of the stationary visual elements in each of stationary visual regions and densities of the moving visual elements in each of moving visual regions is a maximum value.

8. The method according to claim 7, wherein the border determining step further comprises:

dividing the scene into one or more second sub-scenes along the second direction;
dividing each second sub-scene into a second sequence consisting of stationary visual regions and moving visual regions along the first direction, wherein the stationary visual regions and the moving visual regions are alternating with other, and a total number of the stationary visual regions and the moving visual regions is M, which is an integer equal to or greater than 2; and
determining an order of the second sequence and M−−1 borders between the stationary visual regions and the moving visual regions in each second sub-scene in such a manner that a sum of densities of the stationary visual elements in each of stationary visual regions and densities of the moving visual elements in each of moving visual regions is a maximum value.

9. The method according to claim 1, the updating step further comprises:
fitting closed curves according to all borders;
modifying the borders according to said curves to form closed regions, wherein the stationary visual elements or the moving visual elements are dominant in each closed region; and
updating the scene model according to modified borders.

10. The method according to claim 9, wherein the closed curve is fitted in such a manner that the curve is as smooth as possible.

11. A method for video surveillance, comprising:
obtaining a video which is composed of a plurality of visual elements;
updating a scene model in the video by
classifying the visual elements in a scene into stationary visual elements and moving visual elements according to their appearance change rates;
determining borders from the scene according to a spatial distribution information of the stationary visual elements and the moving visual elements wherein the spatial distribution information is sum of a first density of the stationary visual elements at a side of a position and a second density of the moving visual elements at another side of the position and the position as the border is determined based on the sum of the first density and the second density; and
an updating step for updating the scene model according to the determined borders in said scene; and
detecting a foreground object in the video according to the updated scene model.

12. An apparatus for updating a scene model in a video which is composed of a plurality of visual elements, comprising:
one or more processors; and
a memory storing instructions which when executed by the one or more processors operate to control
a classifying unit for classifying the visual elements in a scene into stationary visual elements and moving visual elements according to their appearance change rates;
a border determining unit for determining borders from the scene according to a spatial distribution information of the stationary visual elements and the moving visual elements wherein the spatial distribution information is a sum of a first density of the stationary visual elements at a side of a position and a second density of the moving visual elements at another side of the position and the position as the border is determined based on the sum of the first density and the second density; and
an updating unit for updating the scene model according to the determined borders in said scene.

13. The apparatus according to claim 12, the visual elements is a single pixel or a group of adjoined pixels.

14. The apparatus according to claim 12, wherein the classifying unit further comprises:
a calculating unit for calculating the appearance change rate of said plurality of visual elements; and
a stationary/moving visual element classifying subunit for classifying said plurality of visual elements into the stationary visual elements or the moving visual elements according to a predefined appearance change rate threshold.

15. The apparatus according to claim 14, wherein the appearance change rate of the visual element is calculated based on changes of said visual element in multiple frames in a predefined time period.

16. The apparatus according to claim 15, wherein the appearance change rate of the visual element is calculated based on a changing number of said visual element between every two neighboring frames in multiple frames in a predefined time period.

17. The apparatus according to claim 13, wherein the appearance change rate of the visual element is calculated using a pixel value of the single pixel or an average pixel value of the group of adjoined pixels.

18. The apparatus according to claim 14, wherein the border determining unit further comprises:
a first dividing unit for dividing the scene into one or more first sub-scenes along a first direction;
a second dividing unit for dividing each first sub-scene into a first sequence consisting of stationary visual regions and moving visual regions along a different second direction, wherein the stationary visual regions and the moving visual regions are alternating with each other, and a total number of the stationary visual regions and the moving visual regions is N, which is an integer equal to or greater than 2; and
a first order and border determining unit for determining an order of the first sequence and N−1 borders between the stationary visual regions and the moving visual regions in each first sub-scene in such a manner that a sum of densities of the stationary visual elements in each of stationary visual regions and densities of the moving visual elements in each of moving visual regions is a maximum value.

19. The apparatus according to claim 18, wherein the border determining unit further comprises:
a third dividing unit for dividing the scene into one or more second sub-scenes along the second direction;
a fourth dividing unit for dividing each second sub-scene into a second sequence consisting of stationary visual regions and moving visual regions along the first direction, wherein the stationary visual regions and the moving visual regions are alternating with other, and a total number of the stationary visual regions and the moving visual regions is M, which is an integer equal to or greater than 2; and
a second order and border determining unit for determining an order of the second sequence and M−1 borders between the stationary visual regions and the moving visual regions in each second sub-scene in such a manner that a sum of densities of the stationary visual elements in each of stationary visual regions and densities of the moving visual elements in each of moving visual regions is a maximum value.

20. The apparatus according to claim 12, the updating unit further comprises:

a fitting unit for fitting closed curves according to all borders;

a modifying unit for modifying the borders according to said curves to form closed regions, wherein the stationary visual elements or the moving visual elements are dominant in each closed region; and a scene model updating unit for updating the scene model according to modified borders.

21. The apparatus according to claim 20, wherein the closed curve is fitted in such a manner that the curve is as smooth as possible.

22. An apparatus for video surveillance, comprising:

one or more processors; and a memory storing instructions which when executed by the one or more processors operate to control an obtaining unit for obtaining a video;

an apparatus for updating a scene model in the video which is composed of a plurality of visual elements, the apparatus including a classifying unit for classifying the visual elements in a scene into stationary visual elements and moving visual elements according to their appearance change rates;

a border determining unit for determining borders from the scene according to a spatial distribution information of the stationary visual elements and the moving visual elements wherein the spatial distribution information is a sum of a first density of the stationary visual elements at a side of a position and a second density of the moving visual elements at another side of the position and the position as the border is determined based on the sum of the first density and the second density; and an updating unit for updating the scene model according to the determined borders in said scene; and a detecting unit for detecting a foreground object in the video according to the updated scene model.

* * * * *

UNITED STATES PATENT AND TRADEMARK OFFICE
CERTIFICATE OF CORRECTION

PATENT NO. : 9,659,220 B2  
APPLICATION NO. : 14/626182  
DATED : May 23, 2017  
INVENTOR(S) : Zhao et al.

It is certified that error appears in the above-identified patent and that said Letters Patent is hereby corrected as shown below:

On the Title Page

Item (22), after the phrase "Filed:":  
Delete "Mar. 16, 2015" and insert instead -- Feb. 19, 2015 --.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*